(12) United States Patent
Krick et al.

(10) Patent No.: US 8,751,745 B2
(45) Date of Patent: Jun. 10, 2014

(54) METHOD FOR CONCURRENT FLUSH OF L1 AND L2 CACHES

(75) Inventors: Robert Krick, Longmont, CO (US); David Kaplan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 208 days.

(21) Appl. No.: 12/854,658

(22) Filed: Aug. 11, 2010

(65) Prior Publication Data
US 2012/0042126 A1     Feb. 16, 2012

(51) Int. Cl.
*G06F 12/12*     (2006.01)
(52) U.S. Cl.
USPC ........... 711/122; 711/118; 711/133; 711/135; 711/136

(58) Field of Classification Search
USPC .......................... 711/118, 122, 133, 135, 136
See application file for complete search history.

(56) References Cited

U.S. PATENT DOCUMENTS

| | | | |
|---|---|---|---|
| 2002/0042863 A1* | 4/2002 | Jeddeloh | 711/143 |
| 2003/0151606 A1* | 8/2003 | Morein | 345/422 |
| 2007/0124542 A1* | 5/2007 | Ven | 711/143 |

* cited by examiner

*Primary Examiner* — Jae Yu

(57) ABSTRACT

The present invention provides a method and apparatus for use with a hierarchical cache system. The method may include concurrently flushing one or more first caches and a second cache of a multi-level cache. Each first cache is smaller and at a lower level in the multi-level cache than the second level cache.

12 Claims, 5 Drawing Sheets

METHOD FOR CONCURRENT FLUSH OF L1 AND L2 CACHES

BACKGROUND OF THE INVENTION

1. Field of the Invention

This invention relates generally to processor-based systems, and, more particularly, to concurrent flushing of the multiple caches.

2. Description of the Related Art

Many processing devices utilize caches to reduce the average time required to access information stored in a memory. A cache is a smaller and faster memory that stores copies of instructions and/or data that are expected to be used relatively frequently. For example, central processing units (CPUs) are generally associated with a cache or a hierarchy of cache memory elements. Processors other than CPUs, such as, for example, graphics processing units and others, are also known to use caches. Instructions or data that are expected to be used by the CPU are moved from (relatively large and slow) main memory into the cache. When the CPU needs to read or write a location in the main memory, it first checks to see whether the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the latency of memory accesses below the latency of the main memory to a value close to the value of the cache memory.

One widely used architecture for a CPU cache memory is a hierarchical cache that divides the cache into two levels known as the L1 cache and the L2 cache. The L1 cache is typically a smaller and faster memory than the L2 cache, which is smaller and faster than the main memory. The CPU first attempts to locate needed memory locations in the L1 cache and then proceeds to look successively in the L2 cache and the main memory when it is unable to find the memory location in the cache. The L1 cache can be further subdivided into separate L1 caches for storing instructions (L1-I) and data (L1-D). The L1-I cache can be placed near entities that require more frequent access to instructions than data, whereas the L1-D can be placed closer to entities that require more frequent access to data than instructions. The L2 cache is typically associated with both the L1-I and L1-D caches and can store copies of instructions or data that are retrieved from the main memory. Frequently used instructions are copied from the L2 cache into the L1-I cache and frequently used data can be copied from the L2 cache into the L1-D cache. The L2 cache is therefore referred to as a unified cache.

Caches are typically flushed prior to powering down the CPU. Flushing includes writing back modified or "dirty" cache lines to the main memory and invalidating all of the lines in the cache. Microcode can be used to sequentially flush different cache elements in the CPU cache. For example, in conventional processors that include an integrated L2 cache, microcode first flushes the L1 cache by writing dirty cache lines into main memory. Once flushing of the L1 cache is complete, the microcode flushes the L2 cache by writing dirty cache lines into the main memory.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for use with a hierarchical cache system. The method may include concurrently flushing one or more first level caches and a second level cache of a multi-level cache. Each first cache is smaller and at a lower level in the multi-level cache than the second level cache.

In another embodiment, a multilevel cache is provided. The multilevel cache includes one or more first level caches and a second level cache. Each first cache is smaller and at a lower level in the multi-level cache than the second level cache. The multilevel cache also includes a cache controller configured to control concurrent flushing of the first level cache(s) and the second level cache.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
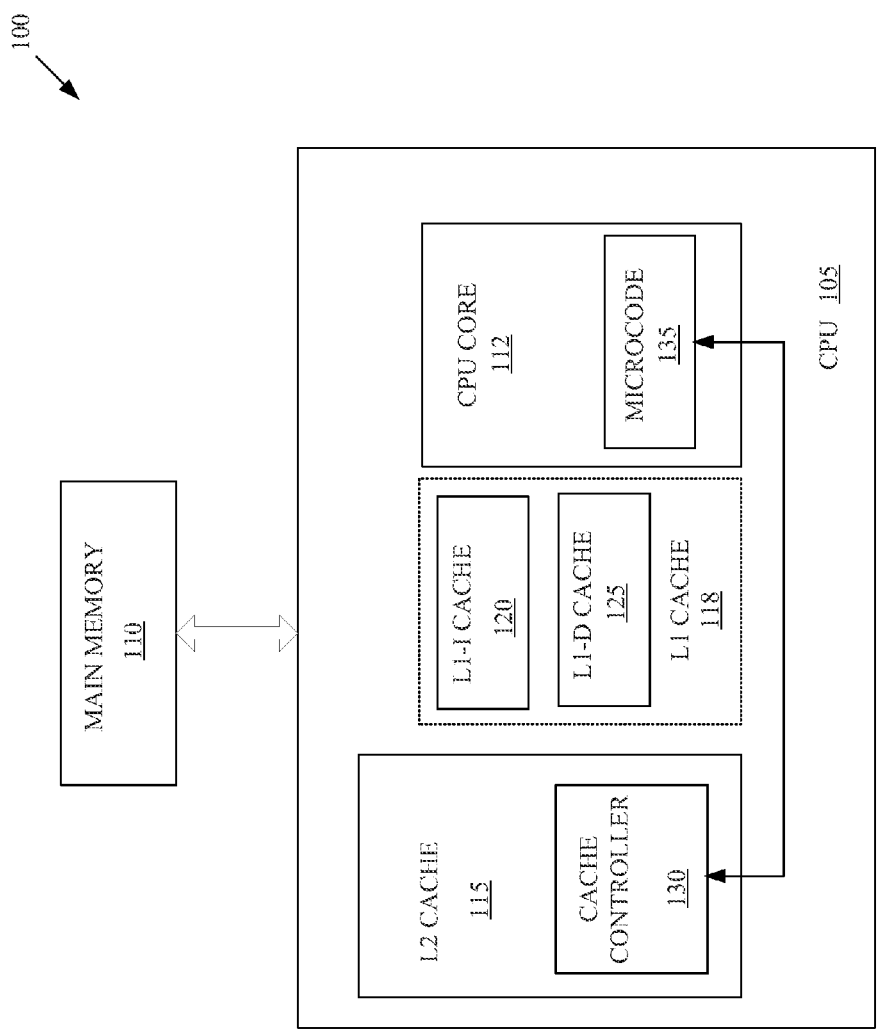
FIG. 1 conceptually illustrates one exemplary embodiment of a semiconductor device that may be formed in or on a semiconductor wafer.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a semiconductor device 100 that may be formed in or on a semiconductor wafer (or die). The semiconductor device 100 may formed in or on the semiconductor wafer using well known processes such as deposition, growth, photolithography, etching, planarising, polishing, annealing, and the like. In the illustrated embodiment, the device 100 includes a central processing unit (CPU) 105 that is configured to access instructions and/or data that are stored in the main memory 110. In the illustrated embodiment, the CPU 105 includes a CPU core 112 that is used to execute the instructions and/or manipulate the data. The CPU 105 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the device 100 may implement different configurations of the CPU 105, such as configurations that use external caches or different types of processors (e.g., GPUs).

The illustrated cache system includes a level 2 (L2) cache 115 for storing copies of instructions and/or data that are stored in the main memory 110. In the illustrated embodiment, the L2 cache 115 is 4-way associative to the main memory 105 so that each line in the main memory 105 can potentially be copied to and from 4 particular lines (which are conventionally referred to as "ways") in the L2 cache 105. However, persons of ordinary skill in the art having benefit of the present disclosure should appreciate that alternative embodiments of the main memory 105 and/or the L2 cache 115 can be implemented using any associativity including 2-way associativity, 16-way associativity, direct mapping, fully associative caches, and the like. Relative to the main memory 105, the L2 cache 115 may be implemented using smaller and faster memory elements. The L2 cache 115 may also be deployed logically and/or physically closer to the CPU core 112 (relative to the main memory 110) so that information may be exchanged between the CPU core 112 and the L2 cache 115 more rapidly and/or with less latency.

The illustrated cache system also includes an L1 cache 118 for storing copies of instructions and/or data that are stored in the main memory 110 and/or the L2 cache 115. Relative to the L2 cache 115, the L1 cache 118 may be implemented using smaller and faster memory elements so that information stored in the lines of the L1 cache 118 can be retrieved quickly by the CPU 105. The L1 cache 118 may also be deployed logically and/or physically closer to the CPU core 112 (relative to the main memory 110 and the L2 cache 115) so that information may be exchanged between the CPU core 112 and the L1 cache 118 more rapidly and/or with less latency (relative to communication with the main memory 110 and the L2 cache 115). Persons of ordinary skill in the art having benefit of the present disclosure should appreciate that the L1 cache 118 and the L2 cache 115 represent one exemplary embodiment of a multi-level hierarchical cache memory system. Alternative embodiments may use different multilevel caches including elements such as L0 caches, L1 caches, L2 caches, L3 caches, and the like.

In the illustrated embodiment, the L1 cache 118 is separated into level 1 (L1) caches for storing instructions and data, which are referred to as the L1-I cache 120 and the L1-D cache 125. Separating or partitioning the L1 cache 118 into an L1-I cache 120 for storing only instructions and an L1-D cache 125 for storing only data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 120 are replaced with instructions from the L2 cache 115 and the lines in the L1-D cache 125 are replaced with data from the L2 cache 115. However, persons of ordinary skill in the art should appreciate that alternative embodiments of the L1 cache 118 may not be partitioned into separate instruction-only and data-only caches 120, 125.

In operation, because of the low latency, the CPU 105 first checks the L1 caches 118, 120, 125 when it needs to retrieve or access an instruction or data. If the request to the L1 caches 118, 120, 125 misses, then the request may be directed to the L2 cache 115, which can be formed of a relatively larger and slower memory element than the L1 caches 118, 120, 125. The main memory 110 is formed of memory elements that are larger and slower than the L2 cache 115 and so the main memory 110 may be the object of a request when it receives cache misses from both the L1 caches 118, 120, 125 and the unified L2 cache 115.

The caches 115, 118, 120, 125 can be flushed by writing back modified (or "dirty") cache lines to the main memory 110 and invalidating other lines in the caches 115, 118, 120, 125. Cache flushing may be required for some instructions performed by the CPU 105, such as a write-back-invalidate (WBINVD) instruction. Cache flushing may also be used to support powering down the CPU 105 for various power saving states. For example, the CPU core 112 may be powered down (e.g., the voltage supply is set to 0V in a c6 state) and the CPU 105 and the caches 115, 118, 120, 125 may be powered down several times per second to conserve the power used by these elements when they are powered up. Cache flushing may therefore be performed very frequently. The conventional approach to cache flushing is to flush the L1 caches 118, 120, 125 and, once flushing of the L1 caches is complete, to proceed sequentially to flush the L2 cache 115. Performing sequential flushing of the L1 and L2 caches 115, 118, 120, 125 with microcode typically takes approximately 270 K clock cycles in typical embodiments, although persons of ordinary skill in the art should appreciate that the exact number of clock cycles is dependent upon the size of the caches used for the particular embodiment. These cycles may not represent a significant overhead when the cache only needs to be flushed occasionally (e.g., when a user powers down a computer at the end of the day). However, the 270 K clock cycles may generate a significant delay and/or latency when they are repeated several times per second.

A cache controller 130 is implemented in the CPU 105 to control and coordinate flushing the caches 115, 118, 120, 125. In the illustrated embodiment, the cache controller 130 is implemented in hardware as part of the L2 cache 115. Using hardware to implement portions of the cache controller 130 that are used to control cache flushing operations may have a number of advantages that are discussed herein. However, persons of ordinary skill in the art having benefit of the present disclosure should appreciate that in alternative embodiments portions of the cache controller 130 may be implemented in hardware, firmware, software, or any combination thereof. Moreover, the cache controller 130 may be implemented in other locations internal or external to the CPU 105.

The cache controller 130 is electronically and/or communicatively coupled to the L2 cache 115, the L1 cache 118, and the CPU core 112. In some embodiments, other elements may intervene between the cache controller 130 and the caches 115, 118, 120, 125 without necessarily preventing these entities from being electronically and/or communicatively coupled as indicated. Moreover, in the interest of clarity, FIG. 1 does not show all of the electronic interconnections and/or communication pathways between the elements in the device 100. Persons of ordinary skill in the art having benefit of the present disclosure should appreciate that the elements in the device 100 may communicate and/or exchange electronic signals along numerous other pathways that are not shown in FIG. 1. For example, information may be exchanged directly between the main memory 110 and the L1 cache 118 so that lines can be written directly into and/or out of the L1 cache 118. The information may be exchanged over buses, bridges, or other interconnections.

The cache controller 130 is configured to coordinate operation of the CPU core 112, the L1 cache 118, and the L2 cache 115 so that the caches 115, 118 can be concurrently flushed. In one embodiment, the CPU core 112 implements microcode 135 that can control, coordinate, and in some cases perform flushing of the caches 115, 118, 120, 125. For example, the microcode 135 can signal the cache controller 130 (which may be implemented in hardware) to flush a portion (such as one or more indexes or ways) of the L2 cache 115. Alternatively, the microcode 135 could perform flushing of the L2 cache 115. The microcode 135 concurrently flushes a portion of the L1 cache 118 and when flushing of the L1 cache 118 is finished the microcode 135 polls the L2 cache 115 to determine whether flushing of the L2 cache 115 is complete. In one embodiment, the sizes of the portions of the L1 and L2 caches 118, 115 to be flushed can be selected so that flushing of the portion of the L2 cache 115 is expected to complete prior to or at approximately the same time as completion of flushing of the portion of the L1 cache 118. Concurrently flushing the L2 cache 115 and the L1 cache 118 can reduce the latency of the cache flushing process, as discussed herein.

Figure 2:
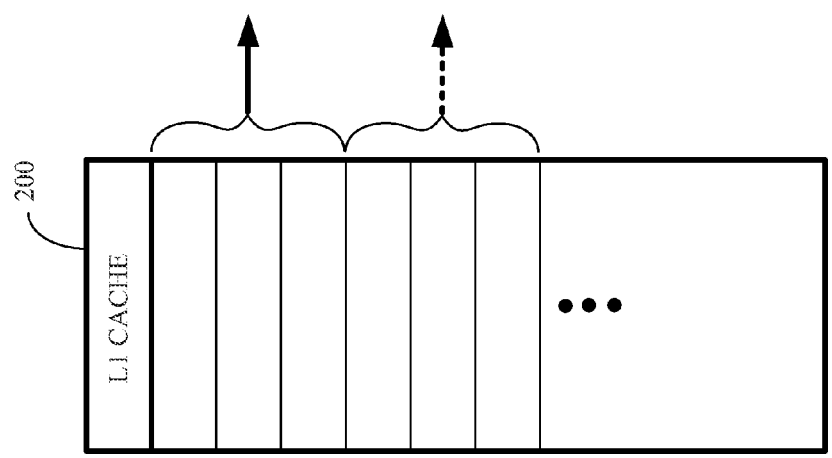
FIG. 2 conceptually illustrates concurrent flushing of an L1 cache and an L2 cache.
Figure 2:
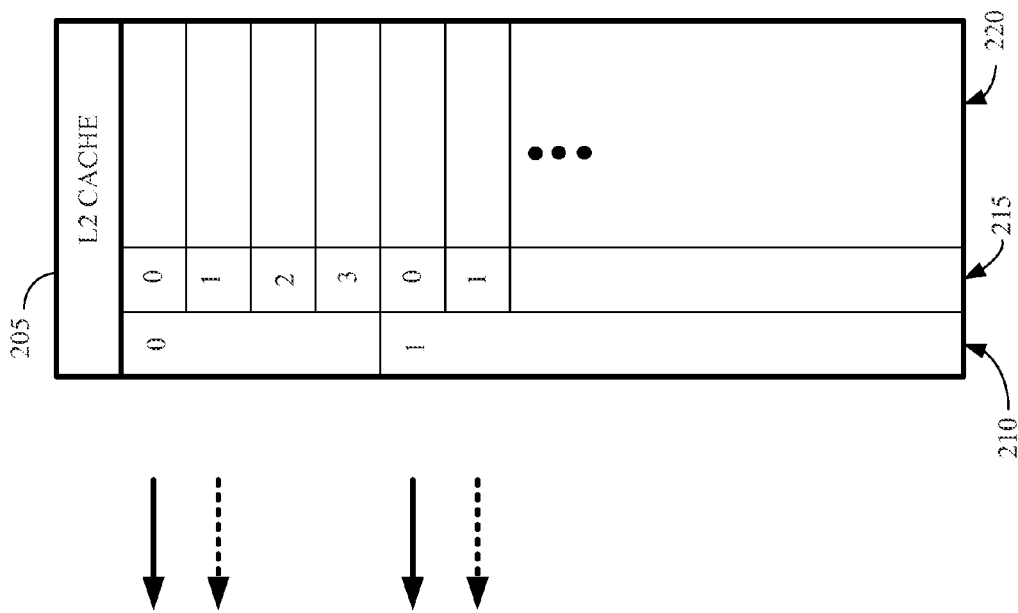

FIG. 2 conceptually illustrates concurrent flushing of an L1 cache 200 and an L2 cache 205. In the illustrated embodiment, the L2 cache 205 is 4-way associative. The indexes are indicated in column 210 and the ways in the L2 cache 205 are indicated by the numerals 0-3 in the column 215. The column 220 indicates the associated cache lines, which may include information or data. FIG. 2 shows two iterations of a concurrent cache flushing technique. In the first iteration, way 0 is flushed from the L2 cache 205, as indicated by the solid arrows. A corresponding portion of the lines of the L1 cache 200 are concurrently flushed (as indicated by the solid arrow) with way 0 of the L2 cache 205. In the second iteration, way 1 is flushed from the L2 cache 205, as indicated by the dotted arrows. A corresponding portion of the lines of the L1 cache 200 are concurrently flushed (as indicated by the solid arrow) with way 0 of the L2 cache 205.

In the illustrated embodiment, approximately ¼ of the lines of the L1 cache 200 are concurrently flushed with each way of the L2 cache 205 because the L2 cache 205 is 4-way associative. In alternative embodiments, approximately 1/N of the lines of the L1 cache 200 may be concurrently flushed with each way of an N-way associative L2 cache 205. As used in the present context, the term "approximately" indicates that in some cases it may not be possible or desirable to flush precisely 1/N of the lines of the L1 cache 200 concurrently with flushing each way of the L2 cache 205. Furthermore, in various alternative embodiments, different portions of the L1 cache 200 may be flushed concurrently with various portions of the L2 cache 205. For example, the L1 cache 200 may be flushed by either index or way while the L2 cache is concurrently flushed by either index or way.

Figure 3:
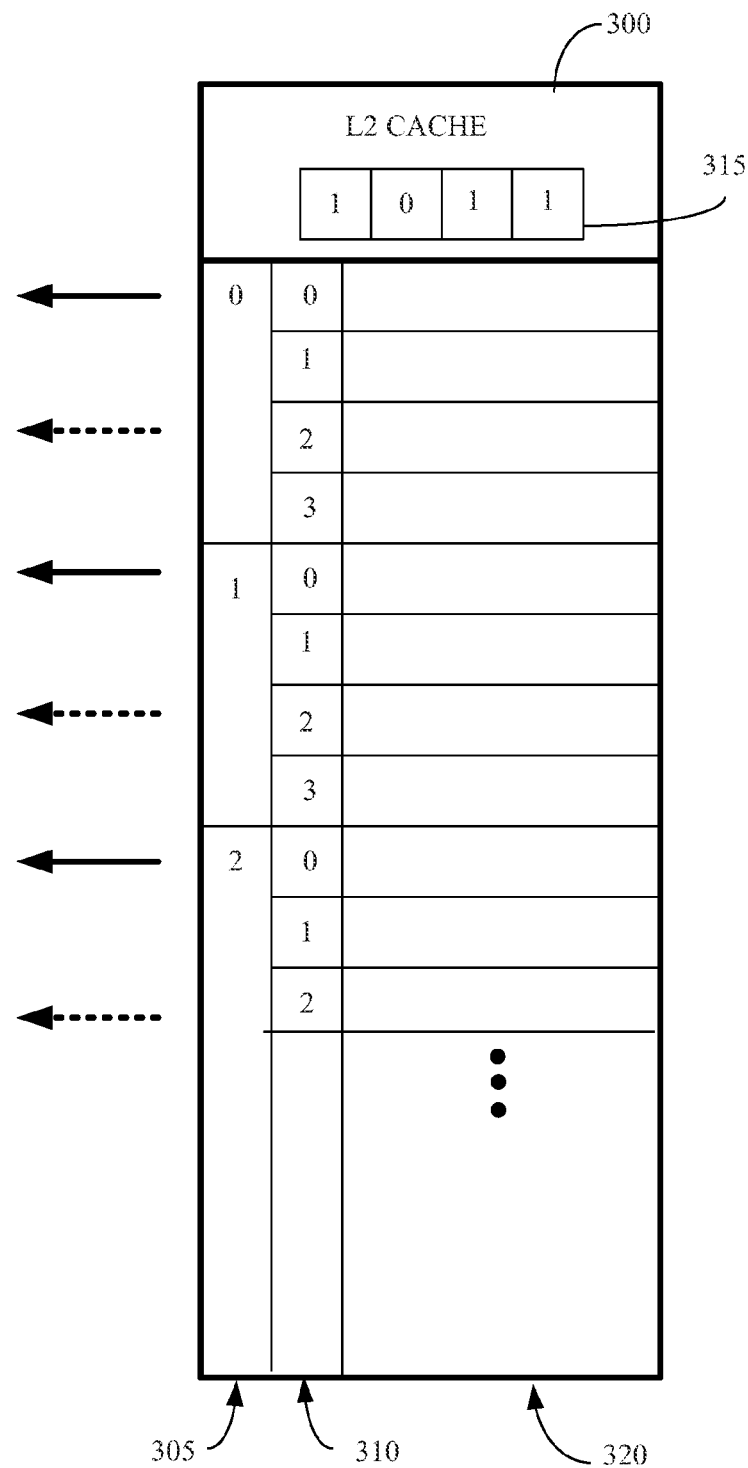
FIG. 3 conceptually illustrates one alternative embodiments of an L2 cache.

FIG. 3 conceptually illustrates one alternative embodiment of an L2 cache 300. In the illustrated embodiment, the L2 cache 300 is 4-way associative. The indexes are shown in column 305 and the ways in the L2 cache 310 are indicated by the numerals 0-3 in the column 305. The array 315 includes a valid bit that indicates whether the data in the way/line is valid. In the illustrated embodiment, the data in the way is valid if the valid bit has a value of "1" and the data in the way is not valid if the valid bit has a value of "0." However, in alternative embodiments other valid bit indications may be used. Invalid lines or ways may not need to be flushed. In one alternative embodiment, which may be used independently of and/or in conjunction with the valid bit indications, one or more "dirty" bits, which are bits that indicate if the main memory version of the line is correct or not, may also used to indicate whether or not it is necessary to flush a line of a cache. For example, if a dirty bit indicates that a line in the main memory is not dirty, then it may not be necessary to flush this line/way.

The column 320 includes the associated cache lines, which may include information or data. FIG. 3 shows three iterations of a concurrent cache flushing technique. In the first iteration, lines in way 0 that include valid data (as indicated by 1 in the first bit of the array 315) are flushed from the L2 cache 300, as indicated by the solid arrows. In the second iteration, the cache controller determines that the second bit in the array 315 includes a value of "0" that indicates that the way 1 does not include valid information. The cache controller therefore determines that it is not necessary to flush the way 1 and can quickly move on to the next line. In the third iteration, the third that in the array 315 indicates that way 2 includes valid data and so this data is flushed from the L2 cache 205, as indicated by the dotted arrows. The valid bits can be set whenever a cache line is allocated to the corresponding way and the valid bits can be cleared with RESET, a write-back-invalidate command (WBINVD), an invalidate command (INVD), or other invalidation events such as probes from another processor/device, cache-line flush instruction (CLFLUSH), and the like. Incorporating the valid bit array 315 into the L2 cache 300 may therefore reduce the amount of processing required to flush the L2 cache 300.

Figure 4:
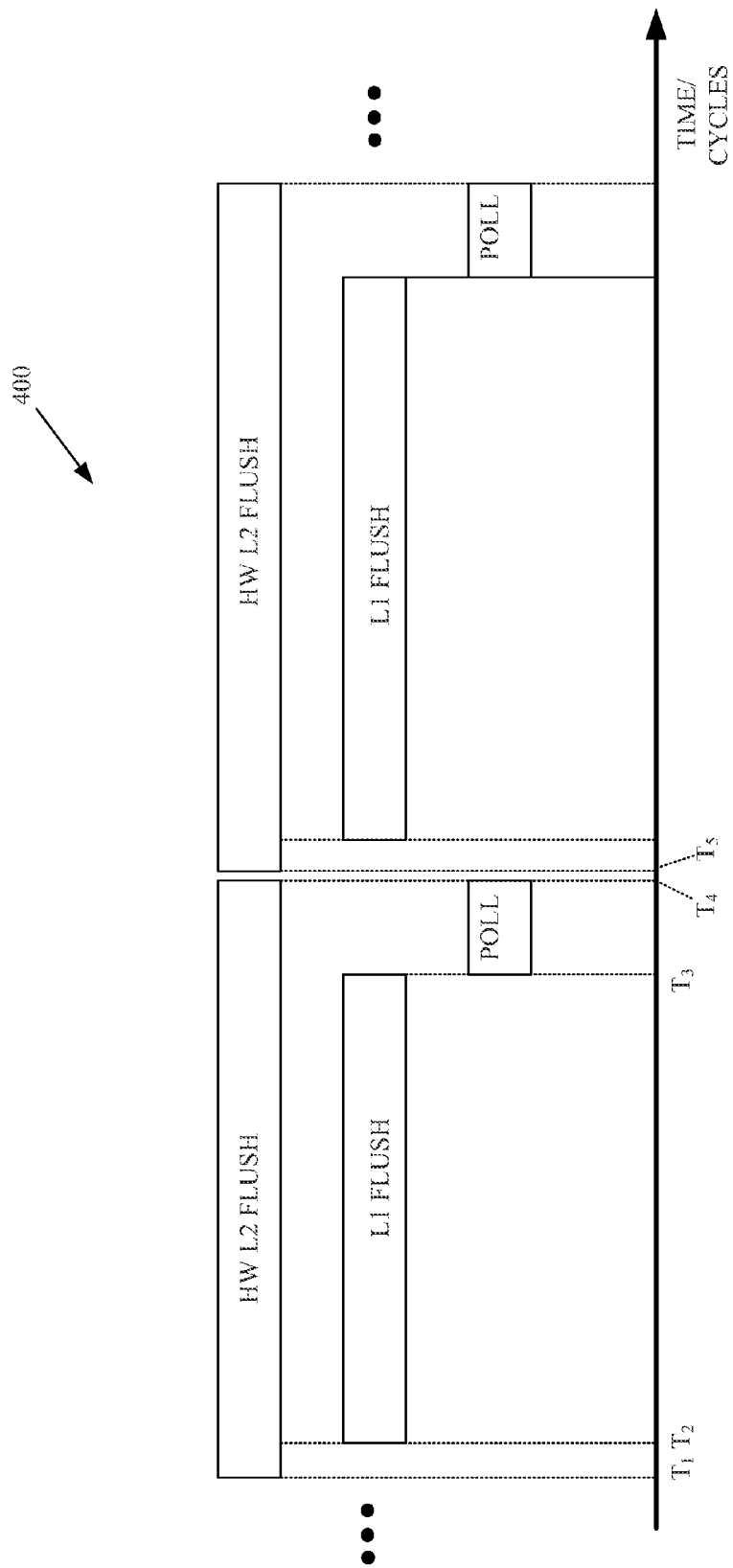
FIG. 4 conceptually illustrates an exemplary timeline for concurrent flushing of multiple caches.

FIG. 4 conceptually illustrates an exemplary timeline 400 for concurrent flushing of multiple caches. The horizontal axis in FIG. 4 indicates time, which increases from left to right as indicated by the arrow. Time can be measured in units of clock cycles, e.g., using clock timing provided by an internal and/or external clock. In the illustrated embodiment, a flush of the L2 cache is initiated at time $T_1$. Flushing of the L2 cache is initiated by microcode in a cache controller and may be performed by the microcode or by dedicated hardware. The L2 cache flush depicted in FIG. 4 is performed using hardware (HW). The microcode initiates and performs a flush of the L1 cache beginning at time $T_2$. Flushing of the L1 cache and the L2 cache then proceeds concurrently until the time $T_3$ when the flush of the L1 cache completes. The cache controller polls (starting at time $T_3$) the hardware that is performing the flush of the L2 cache to determine whether the hardware flush of the L2 cache has completed. The HW flush of the L2 cache completes at time $T_4$ and a response to the poll indicates completion. The next iteration of the concurrent flushing process proceeds (after a slight delay of perhaps a few cycles) at time $T_5$. Although not shown in FIG. 4, the concurrent flushing process can pause between iterations to detect and/or service system interrupts.

Figure 5:
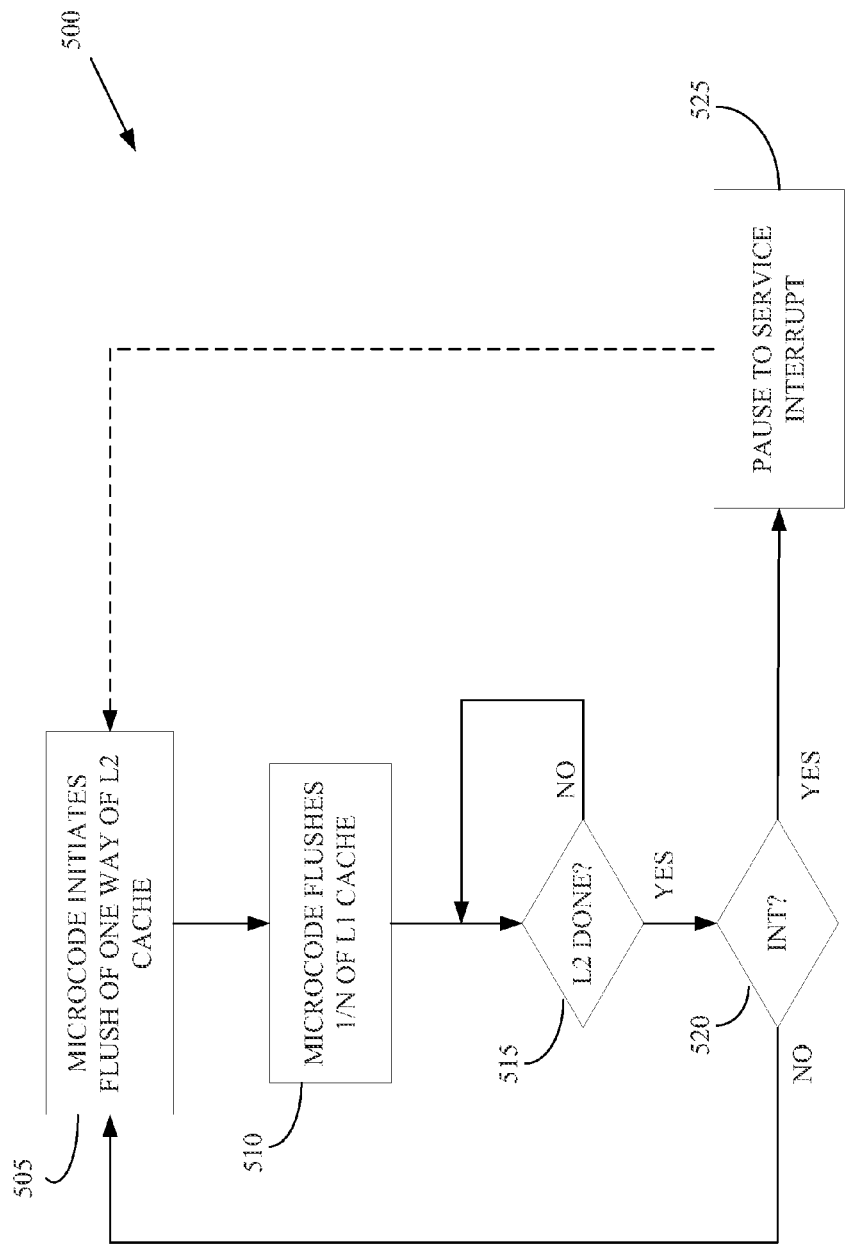
FIG. 5 conceptually illustrates one exemplary embodiment of a method of concurrently flushing multiple caches.

FIG. 5 conceptually illustrates one exemplary embodiment of a method 500 of concurrently flushing multiple caches. In the illustrated embodiment, a cache controller includes microcode that initiates (at 505) flushing of a single way of the L2 cache. However, persons of ordinary skill in the art having benefit of the present disclosure should appreciate that in alternative embodiments more ways can be flushed during each iteration. Moreover, flushing of the L2 cache may be done by index instead of way. Once the L2 flush has been initiated (at 505), flushing of the L2 cache proceeds using either hardware or microcode depending on the embodiment.

The microcode begins flushing (at 510) a selected subset of the L1 cache concurrently with flushing the L2 cache. For example, the microcode may flush the L1 cache by doing explicit CD writes that back-probe lines out of the L1 cache based on index and/or way. In the illustrated embodiment, the L2 cache is N-way associative and a fraction 1/N of the lines in the L1 cache are flushed during each iteration. However, in alternative embodiments, larger or smaller or portions of the lines in the L1 cache may be flushed concurrently with portions of the L2 cache. For example, the relative number of lines of the L1 cache and the L2 cache that are flushed concurrently in each iteration may be selected so that flushing of the L2 cache completes a selected number of cycles before flushing of the L1 cache completes.

The cache controller polls (at 515) the hardware and/or microcode that is used to flush the L2 cache to determine whether flushing of the selected ways has completed. The cache controller continues to monitor and poll (at 515) the hardware and/or microcode that is used to flush the L2 cache until it determines that flushing of the L2 cache has completed. The interval between polls is a matter of design choice. Alternatively, other communication mechanisms could be used instead of polling. For example, the cache controller could send an interrupt to microcode when the flush is complete. The cache controller may then determine (at 520) whether any interrupts are currently pending. If there are no pending interrupts, the process can proceed to the next iteration and the microcode can initiate (at 505) flushing of the next way of the L2 cache. If the cache controller detects (at 520) one or more pending interrupts, then the flushing process may pause (at 525) between iterations to allow the interrupt(s) to be serviced. Depending on the circumstances and the state of the system following the interrupt, the flushing process may be able to continue (as indicated by the dashed line) and the microcode can initiate (at 505) the next iteration of the flushing process. However, in some cases, the interrupt may result in suspending the flushing process.

Embodiments of the techniques described herein can significantly reduce the delays and/or latency of cache flushes in hierarchical caches. Flushing each cache line using hardware requires two clock cycles to read the line and two more clock cycles to write out the line. The microcode that controls and coordinates the hardware flush adds approximately 3000 cycles of overhead. Flushing a typical L2 cache of 8 k (i.e. 8192) lines with hardware therefore requires approximately 30-35,000 cycles. Flushing a typical L1 cache with microcode requires approximately 10-15 clock cycles per line. However, the number of lines in a typical L1 cache is smaller than the number of lines in a typical L2 cache by a factor of about $\frac{1}{8}$-$\frac{1}{16}$. Consequently, in this example the total number of cycles used to concurrently flush the L1 cache and the L2 cache is controlled by the L2 cache and so the concurrent flushing process uses approximately 30-35,000 cycles. In contrast, using microcode to perform a conventional sequential flush of the L1 and L2 caches typically takes about 270K cycles for an L2 cache that has approximately 8000 lines and L1 caches that have between 500 and 1000 lines. The concurrent cache flushing process described herein can therefore improve latency by a factor of about 8. Using microcode to concurrently flush both the L1 cache and the L2 cache also improve latency relative to the conventional sequential flushing process but the latency gain is smaller. Persons of ordinary skill in the art should appreciate that the specific numbers presented in the preceding example are intended to be illustrative and may vary in different embodiments or implementations.

Embodiments of processor systems that can handle lane crossing instructions as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   concurrently flushing at least one first cache and a second cache of a multi-level cache of a processor, wherein each first cache is smaller and at a lower level in the multi-level cache than the second cache, and wherein concurrently flushing comprises:
   flushing a single way of the second cache using hardware in response to a signal provided by microcode, wherein the second cache includes N ways; and
   flushing a number of lines of said at least one first cache using the microcode, wherein the number corresponds to 1/N of the lines.

2. The method of claim 1, wherein concurrently flushing said at least one first cache and the second cache comprises flushing said at least one first level cache using at least one of microcode or hardware and flushing the second cache using at least one of microcode or hardware.

3. The method of claim 1, wherein concurrently flushing said at least one first cache and the second cache comprises concurrently flushing a first portion of said at least one first cache and a second portion of the second cache.

4. The method of claim 1, comprising iteratively repeating concurrent flushing a single way of the second cache and the number of the lines of said at least one first cache until said at least one first cache and the second cache are completely flushed.

5. The method of claim 4, comprising determining that an iteration of said concurrent flushing is complete by polling the hardware used to flush the second cache using the microcode.

6. The method of claim 4, comprising using the microcode to determine whether an interrupt is pending after each iteration and stopping said concurrent flushing to service pending interrupts.

7. A multi-level cache, comprising:
   at least one first cache and a second cache, wherein each first cache is smaller and at a lower level in the multi-level cache than the second cache, and wherein the second cache includes N ways; and
   a cache controller configured to control concurrent flushing of said at least one first cache and the second cache, wherein the cache controller is to control the concurrent flushing to flush only those ways of said at least one first cache and said second cache that include valid data, and wherein the cache controller is to control concurrent flushing by:
   providing a signal to hardware to initiate flushing a selected portion or combination of ways of the second cache; and
   flushing 1/N of lines of said at least one first cache using microcode.

8. The multi-level cache of claim 7, wherein the cache controller is configured to select a first portion of said at least one first cache and a second portion of the second cache so that the first portion and the second portion can be flushed concurrently.

9. The multi-level cache of claim 8, wherein the second cache includes N ways; and wherein the cache controller is configured to:
   provide a signal to the hardware to initiate flushing a selected portion or combination of ways of the second cache; and
   flush approximately 1/N of the lines of said at least one first cache using the microcode.

10. The multi-level cache of claim 9, wherein the cache controller is configured to iteratively repeat concurrent flushing of the first portion and the second portion until said at least one first cache and the second cache are completely flushed.

11. The multi-level cache of claim 10, wherein the cache controller is configured to determine that an iteration of said concurrent flushing of the first portion and a second portion is complete by polling the hardware used to flush the second cache using the microcode.

12. The multi-level cache of claim 10, wherein the cache controller is configured to use the microcode to determine whether an interrupt is pending after each iteration and to stop said concurrent flushing so that pending interrupts can be serviced.

* * * * *